(12) United States Patent  (10) Patent No.: US 8,099,898 B2
Dungan                     (45) Date of Patent:    Jan. 24, 2012

(54) ICE FISHING DEVICE

(75) Inventor: Matt W. Dungan, Rigby, ID (US)

(73) Assignee: Matt Dungan, Rigby, ID (US)

( * ) Notice: Subject to any disclaimer, the term of this patent is extended or adjusted under 35 U.S.C. 154(b) by 0 days.

(21) Appl. No.: 12/661,797

(22) Filed: Mar. 23, 2010

(65) Prior Publication Data

US 2010/0186281 A1    Jul. 29, 2010

Related U.S. Application Data

(63) Continuation of application No. 11/872,442, filed on Oct. 15, 2007, now Pat. No. 7,716,867.

(51) Int. Cl.
    *A01K 87/00* (2006.01)
(52) U.S. Cl. ............................. 43/19.2; 43/15
(58) Field of Classification Search .................. 43/4, 15, 43/21.2, 26.1, 27.4, 42.7, 19.2
    See application file for complete search history.

(56) References Cited

U.S. PATENT DOCUMENTS

| 2,861,378 | A | * | 11/1958 | Bell | 43/19.2 |
| 3,691,668 | A | * | 9/1972 | Strebig | 43/19.2 |
| 4,197,668 | A | * | 4/1980 | McKinsey | 43/15 |
| 4,597,215 | A | * | 7/1986 | Otremba | 43/19.2 |
| 4,811,514 | A | * | 3/1989 | Jordan | 43/19.2 |
| 4,916,847 | A | * | 4/1990 | Rusgo | 43/19.2 |
| 4,932,151 | A | * | 6/1990 | Cicha | 43/19.2 |
| 5,119,580 | A | * | 6/1992 | Schulte et al. | 43/19.2 |
| 5,437,121 | A | * | 8/1995 | Chacon et al. | 43/19.2 |
| 5,540,010 | A | * | 7/1996 | Aragona | 43/19.2 |
| 5,570,534 | A | * | 11/1996 | Ford | 43/19.2 |
| 5,638,628 | A | * | 6/1997 | Davis | 43/4.5 |
| 6,009,656 | A | * | 1/2000 | Knepp | 43/26.1 |
| 6,415,543 | B2 | * | 7/2002 | Keller | 43/19.2 |
| 6,651,373 | B2 | * | 11/2003 | Harris | 43/4 |
| 2001/0049899 | A1 | * | 12/2001 | Keller | 43/19.2 |
| 2006/0032105 | A1 | * | 2/2006 | Modglin | 43/19.2 |
| 2006/0248778 | A1 | * | 11/2006 | Ward et al. | 43/19.2 |

* cited by examiner

*Primary Examiner* — Joshua Michener

(57) ABSTRACT

Disclosed is an ice fishing device which holds a fishing rod in a bent position until a fish strikes the line. A trigger releases the tip of the fishing rod, and the rod tip snaps up and sets the hook. A jigging assembly imparts an up and down movement to the line and the attached hook, to attract fish to the hook and bait.

8 Claims, 5 Drawing Sheets

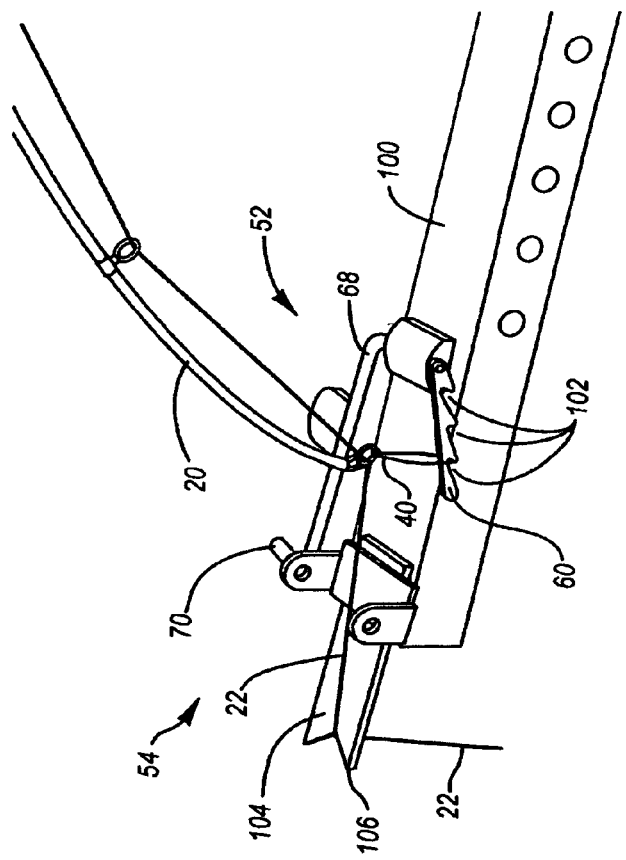
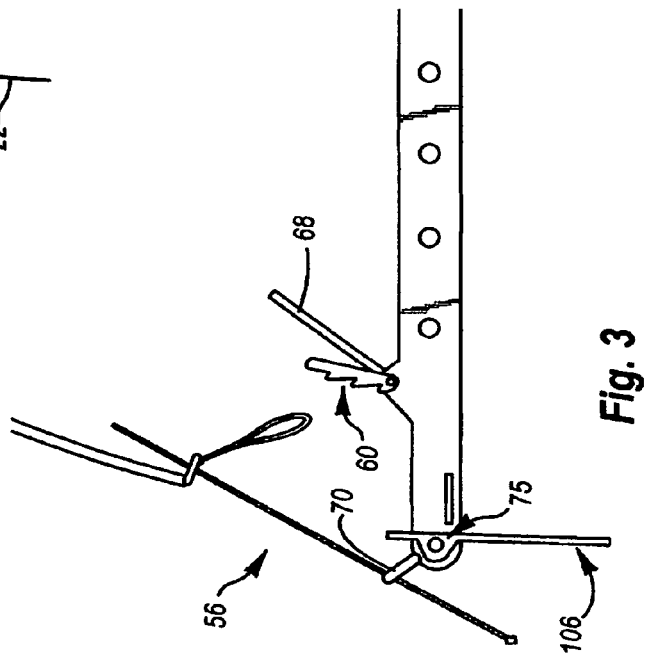

ICE FISHING DEVICE

This is a continuation of application Ser. No. 11/872,442 now U.S. Pat. No. 7,716,867 Filing date Oct. 15, 2007

FIELD OF THE INVENTION

The invention relates generally to an apparatus for ice fishing, and more particularly to a device for automatic setting of a hook and for jigging when ice fishing.

BACKGROUND OF THE INVENTION

This invention relates to ice fishing, and more particularly to a device for holding a fishing rod, and setting the hook when a fish takes the attached bait. Ice fishing is sport in which a person cuts a hole in the ice on a frozen body of water, and fishes for fish through the hole in the ice. When a fish takes the bait at the end of the line, the fisherman gives the rod a tug which sets the hook in the fishes' mouth before he has a chance to spit out the bait. Once the fish is hooked, the fisherman reels the fish in and pulls the fish out of the hole in the ice.

There are several devices which have been utilized to assist the fisherman in this activity. Some devices for ice fishing include a pole holder which holds the pole over the hole in the ice, and may include a signal which tells the fisherman that a fish is on the line. There are other devices in the field of ice fishing which senses the fish striking the bait and will cause the tip of the rod to jerk upward. Other devices eliminate the need for the rod and provide a device which extends over the hole and lowers the line into the hole, and pulls the fish up to the hole when he is hooked.

What is needed is an improved ice fishing device which provides a stable base for placement over the hole in the ice, and which holds the fishing rod in a bent position. What is needed is a device that is light and compact for transportation and storage. What is needed is a device which utilizes a triggering system that will in, no way harm the fishing rod, rod guides, or fishing line that runs through the rod guides. What is needed is a device which has the ability to impart movement upon the fishing bait or lure and use this movement in conjunction with a hook setting mechanism. These needs are provided in the current invention.

SUMMARY OF THE INVENTION

These and other goals are accomplished by the present invention. The invention is an ice fishing device for use with a hole that is cut into the ice. It utilizes a fishing rod, which can be a standard fishing rod with a handle, a flexible shaft, a tip on the end of the shaft, with fishing line, fishing line guides on the shaft and a fishing reel for reeling in a fish and storing the fishing line.

The device of the invention includes a device body which has a first end and second end, as well as a top side and a bottom side. The device body includes a rod holding bracket which is attached to the first end of the device body. The rod holding bracket is for holding and securing the handle of the fishing rod at an angle to the device body. At the second end of the device body is a tip holder, for securing the fishing rod tip adjacent to the device body, with the fishing rod shaft in a flexed position. The device includes an attachment device which is attached to one end of the fishing rod in the general region of the tip. The attachment device serves as a point of attachment to attach the tip of the fishing rod to the device body. Thus, one end of the attachment device is secured to the fishing rod in the general region of the tip, and the other end is secured to a release mechanism on the device body. When thus attached, the attachment device holds the fishing rod in a flexed position.

Also attached to the device body is a support pin attached at the first end of the device body. At the second end of the device body are a pair of stabilizing legs which extend outward from the device body. Each stabilizing leg has a support foot, for stabilizing and securing the device to the ice. The support foot can be made of a sharp point for penetrating and gripping ice, or it can be any attachment on the underside of the stabilizing legs which would grip the ice and tend to stabilize the device. This can include a flat foot with a number of gripper teeth, or ridges or small points. The support feet can be made of metal, rubber or a hard plastic which grips the ice securely.

The device includes a trigger which moves from a loaded to a released position. The trigger includes a sensing tab which is sensitive to pressure on the fishing line, and when there is sufficient pressure on the fishing line releases the trigger. The sensing tab releases the trigger mechanism by rotating and causing the trigger mechanism to release the attachment device. The attachment device attaches to the trigger at an attachment device receptacle, and the attachment device receptacle releases the attachment device when sufficient line pressure is sensed by the sensing tab. In the released position the tip of the fishing pole is free to return to a position parallel with the handle which causes the fishing line to snap upward violently. This snap of the fishing pole tip causes the hook on the fishing line to be set in the fish's mouth.

The stabilizing legs are configured for placement adjacent the ice hole. This would generally be on two points along the rim of the ice hole, generally the 4 o'clock and 8 o'clock positions. The stabilizing legs can be configured to be somewhat longer so that they are positioned around an ice hole at approximately the 3 o'clock and 9 o'clock positions. The device is configured to be generally horizontal in use, and thus parallel with the ice itself. The stabilizing legs would typically be hinged so that they fold up parallel to the device body. They could also be telescoping so that they extend into a longer position depending on the needs of the fisherman's situation. The stabilizing legs are generally configured to best operate when they form a generally Y shape with the device body.

The trigger of the device includes an adjustment to increase or decrease the sensitivity of the trigger to tension on the fishing line. The trigger may also be configured so that the trigger mechanism can slide in a distal or proximal direction on the device body to allow for different lengths of rods to be used with the device.

In one configuration of the device, the fishing rod comes with the device and is built into the device. In another configuration of the device the user selects his own separate fishing rod and inserts it into the device. The fishing rod can be made with an integral attachment accessory which can be a modification of the guide ring on the tip of the fishing pole. The trigger can also be configured to secure the tip of a conventional fishing pole without the use of a separate attachment accessory, such as by having a small bar or hook pass through the guide ring on the tip of the fishing pole.

The trigger can be made of a release bar and a trip bar, with the fishing pole tip attached to the release bar when the trigger is in the loaded position. When the trip bar is moved by contact with the fishing line the trip bar releases the release bar and the release bar releases the tip of the fishing pole, at which time the fishing rod tip will spring up and set the hook in the fish's mouth.

The fishing device can also include a safety rod which attaches to the device body and extends generally upward from the device body over the general region of the rod tip. The purpose of the safety rod is to keep the user's head away from the area where the rod tip is most likely to snap upward. The purpose of this is to prevent the user from being struck by the rod tip should the device release prematurely.

The rod holding bracket may be adjustable in the angle in which the rod is held from the device body so that the user may set the desired angle of the rod. By setting the desired angle of the rod, the user is able to adjust for different rod lengths and to achieve the proper force when the rod tip is released. The device body may include a slide out central beam to which the pair of stabilizing legs may be attached. This allows the device to be more compactly stored and allows for greater stability on the ice. The rod holder may be configured to fold down into a recess in the device body, which further facilitates compact storage and easy transport.

The device may include a configuration which is specifically adapted for automated jigging. Jigging is the raising and lowering of the fishing line in rapid succession, possibly at irregular intervals, to stimulate a fish's interest in the bait at the end of the line, and to induce more strikes on the fish hook. In this configuration of the device the device body includes a first frame for holding the rod. The first frame is equivalent to the device body described above. The device body of this configuration further includes a second frame to which the support pins and stabilizing legs are attached. The first frame is attached to the second frame such as by a bracket, which allows the first frame to rotate back and forth with a movement of several inches at the second end, where the fishing rod tip is held down. A jigging device is attached to the second frame which raises and lowers one end of the first frame, causing the second end of the first frame to rise up and down and create a jigging action on the attached fishing line and hook. In one configuration of the device, the jigging device is a rotating shaft with one or more cams, and the cams push the first end of the first frame up, and when released, the first end of the first frame falls down by gravity. Since the first frame is able to pivot in the middle of its length, this causes the second end of the first frame to move up and down. Obviously, such a jigging attachment can be attached to the first end or the second end of the first frame.

In one configuration of the jigging device, the jigging device is made of a motor with a shaft and one or more cams are attached to the rotating shaft. As the shaft rotates, one cam after another will come into contact with the first end of the first frame and cause it to be lifted up several inches in the air and then when it is released it drops several inches. This lifting and dropping action causes a jigging action of the bait on the hook. This version of the device includes a trigger mechanism as described above and when sufficient line pressure is detected, the trigger is released which releases the rod tip to snap into the air and set the hook.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

FIG. 2 is a perspective view of the trigger of the ice fishing device of the invention.

FIG. 3 is a side view of the trigger in released position.

DESCRIPTION OF THE PREFERRED EMBODIMENTS

Figure 1:
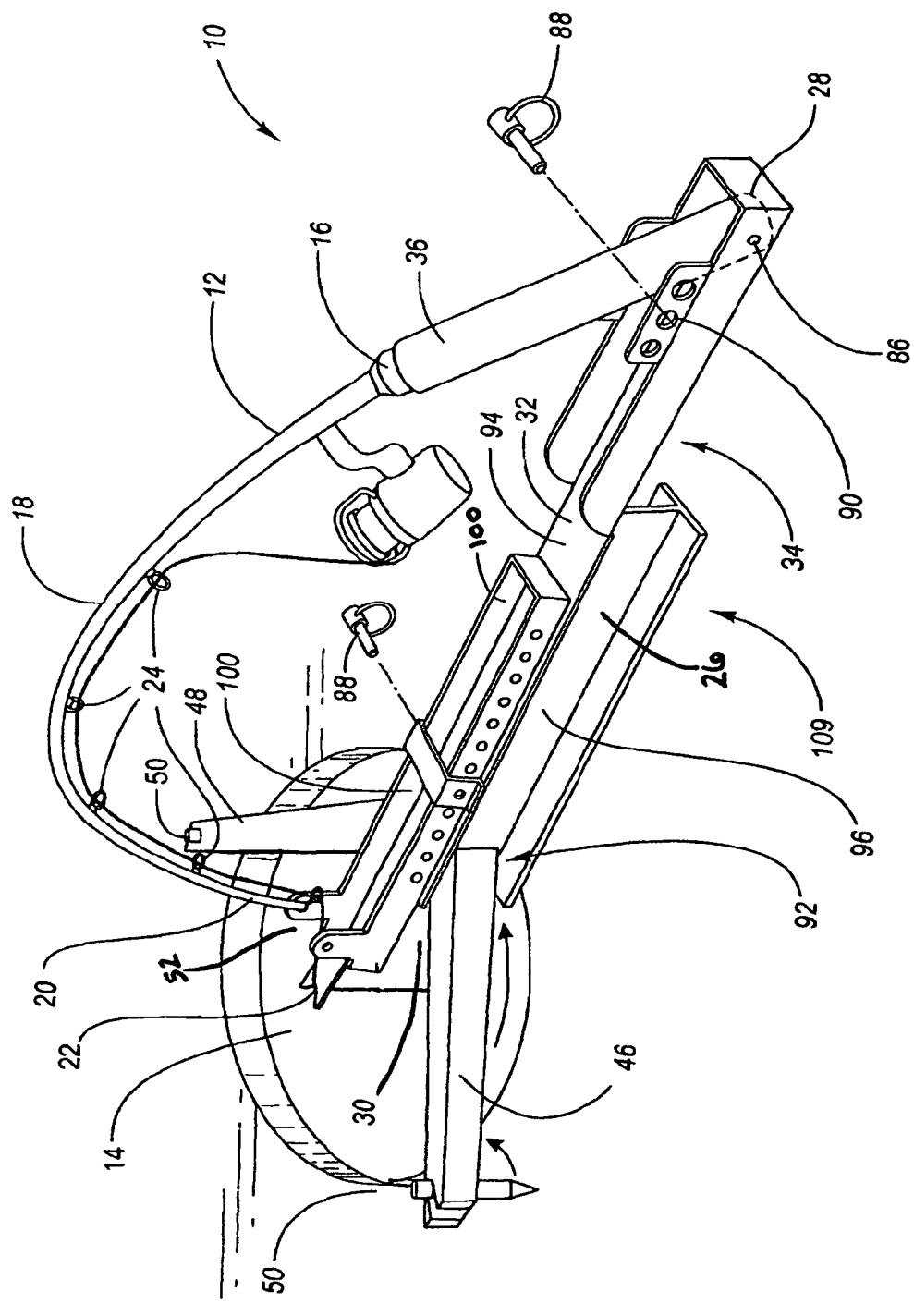
FIG. 1 is a perspective view of an embodiment of the ice fishing device of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

A preferred embodiment of the invention is shown in the figures. FIG. 1 shows the ice fishing device 10 of the invention. Shown in FIG. 1 is a fishing rod 12, which can be a commercial fishing rod which is added to the unit, or it can be a fishing rod which is built into the unit and comes with the unit when purchased. The ice fishing device 10 and the fishing rod 12 are used with a hole cut into ice over a frozen lake, with the hole being designated as 14. The fishing rod 12 includes a rod handle 16, a flexible shaft 18, a rod tip 20, fishing line 22, and line guides 24. The ice fishing device 10 includes a device body 26. The device body 26 includes a first end 28, a second end 30, a top side 32 and a bottom side 34.

Located at the first end 28 of the device body is a rod holding bracket 36. The rod holding bracket 36 is configured to rotate around a bracket mount 86. By being able to rotate, when the fishing rod 12 is removed from the rod holding bracket 36, a bracket pin 88 may be removed and the rod holding bracket 36 may be lowered into an opening in the device body 26. The device includes positioning holes 90 through which the bracket pin 88 passes. A number of different positioning holes 90 allow the rod holding bracket 36 to be positioned at different angles, depending on the preference of the user.

At the second end 30 of the device body 26 are mounted a first stabilizing leg 46 and a second stabilizing leg 48. Preferably these are rotatably mounted around support leg pivots 92. The support legs can be extended into a generally v-shaped configuration as shown in FIG. 1, and they can also be swung back into a recess 96 in the device 26 so that the unit is made compact for storage. At the ends of the stabilizing legs 46 and 48 are mounted support feet 50. The support feet 50 are preferably configured to rotate so that when the stabilizing legs 46 and 48 are rotated into a storage position in the device body 26, the support feet 50 can be rotated into that opening without obstruction.

The support feet 50 can be made in a number of configurations, and one of those is to have a pointed tip as shown in FIG. 1. The support feet 50 can also take a number of other different forms such as the form of a generally flat pad with gripper teeth ridges on the bottom of the pad. The configuration of the support feet 50 can be varied and any design which tends to grip snow or ice would be suitable for the configuration of the support feet 50.

A preferred embodiment of the device body 26 is one in which the stabilizing legs 46 and 48 are made of molded plastic, fiber glass, or aluminum (rigid material) and are approximately 9¾ inches in length. They are attached to a top deck 94 of the device body 26, with the top deck 94 being made of rigid material, and being approximately 1½ by 14 inches in diameter. The stabilizing legs 46 and 48 are also attached to a bottom deck 109.

Figure 5:
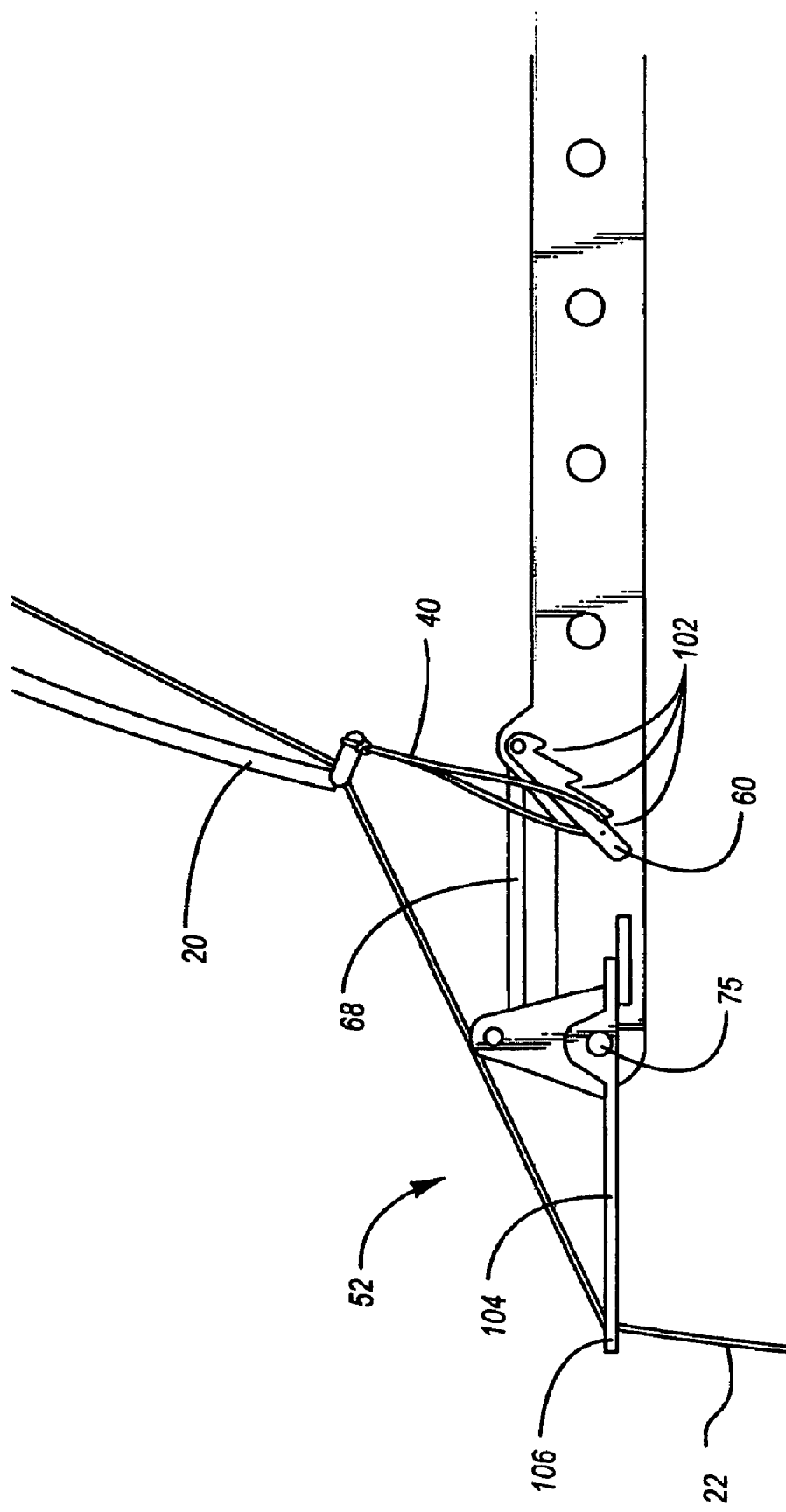
FIG. 5 is a side view of the trigger of the ice fishing device of the invention.

The ice fishing device 10 also includes a trigger 52 which is shown in more detail in FIG. 2 and FIG. 3, and FIG. 5. The trigger 52 is attached to an adjustment bar 100. By moving the adjustment bar 100 along the top side 32 of the device body 26, the trigger 52 can be moved to accommodate different sizes of fishing rods. The trigger is made of two pieces, a release bar 68 and a trip bar 70. Both bars are attached to the adjustment bar 100, which is made of rigid material and is approximately ¾ by 13 inches, and is of channel tubing. Obviously these sizes can be modified for different sizes of fishing devices and to the preference of the user.

FIG. 2 shows the rod tip 20 with an attachment accessory 40 attached to the rod tip 20. The attachment accessory 40 is attached at one of its ends to the rod tip 20, and at the other end to an attachment accessory receptacle 60. The attachment accessory receptacle 60 is part of the release bar 68, and includes one or more notches 102 into which the attachment accessory 40 fits. As long as the release bar 68 is held in a generally horizontal position as shown in FIG. 2, the attachment accessory 40 is held in one of the notches 102, and the rod tip 20 is held in place. The release bar 68 is held in this position by the trip bar 70.

The trip bar 70 is attached to a sensing tab 104 which is mounted to the adjustment bar 100 by a sensing tap pivot 75. Fishing Line 22 from the rod tip 20 extends over the sensing tab 104 into a grove 106 that keeps the fishing line 22 in place over the sensing tab. The fishing line 22 extends through the hole in the ice 14, and has at its end a hook with typical fishing bait or a lure attached. When a fish takes the hook in its mouth, additional tension on fishing line 22 causes the sensing tab 104 to rotate downward. This causes the trip bar 70 to move slightly forward and to allow the release bar 68 to flip up and release the attachment accessory 40, therefore releasing the rod tip 20 to snap up and set the hook in the fishes' mouth.

FIG. 2 shows the device in the loaded position 54 and FIG. 3 shows the trigger in a released position 56, in which the release bar 68 has been released by the trip bar 70, and the tip of the fishing rod 20 has been released.

Figure 4:
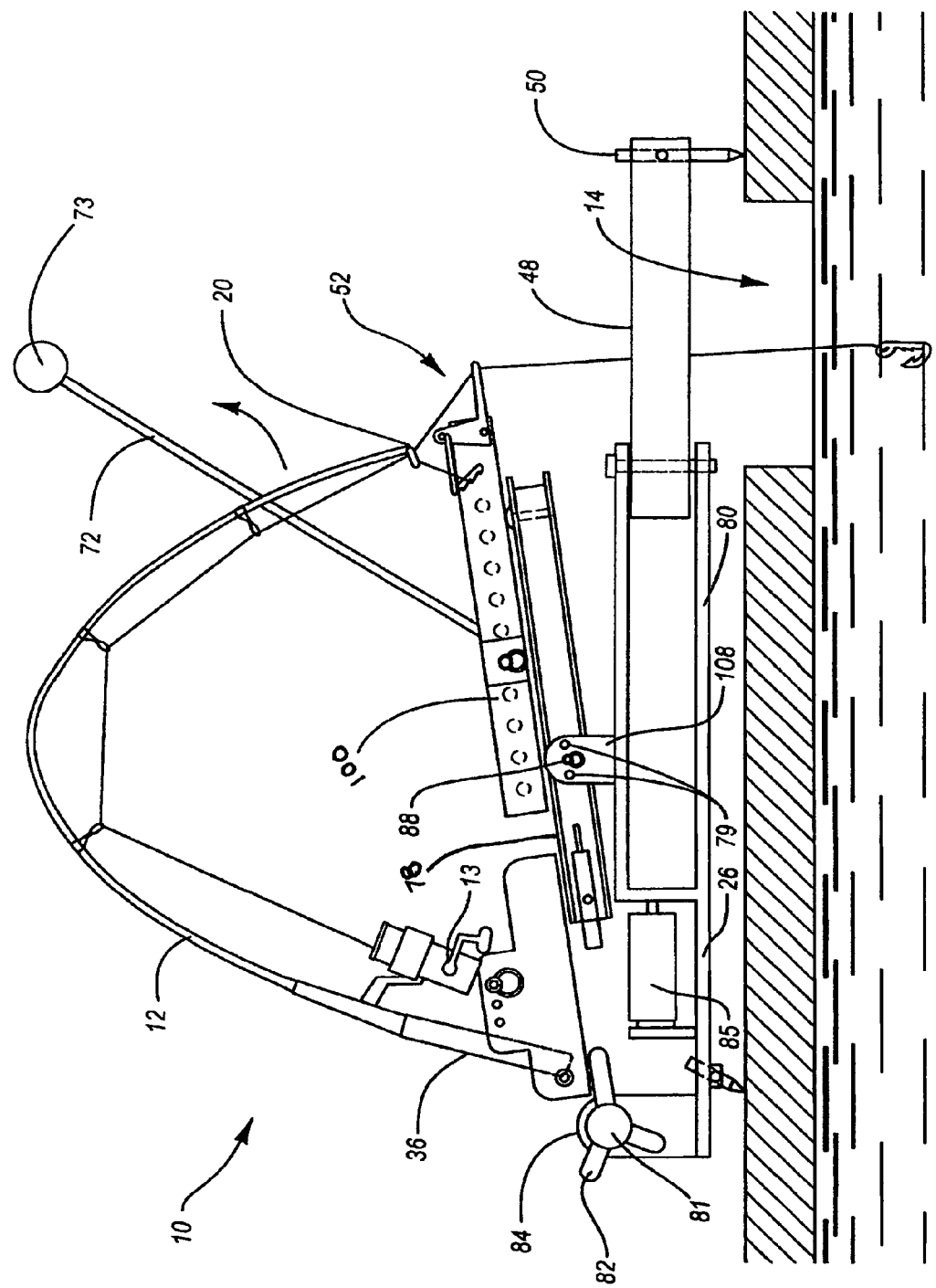
FIG. 4 is a side view of the jigging version of the ice fishing device of the invention.

Shown in FIG. 4 is another preferred embodiment of the current invention. In this embodiment, the device body includes a first frame 78, and a second frame 80. The trigger mechanism 52 is shown, as is the rod holding bracket 36, the fishing rod 12, with a reel 13. In addition, an optional safety rod 72 is shown, which is attached to the rod holding frame and extends in the general region above the rod tip 20. Its purpose is to keep the user's face out of the general region of the rod tip 20 when it is secured to the trigger device. This is a safety feature and tends to keep the user from the area in which he would most likely experience a slap from the rod tip if it was released accidentally. The Safety rod 72 may be placed on the left or right side of the rod holding frame 78, depending on which side the trigger is to be set from. The safety rod 72 may have a ball 73 on its end to prevent the user from having an accident with the end of the safety rod 72.

In this version of the ice fishing device 10, the second frame 80 has attached to it the first and second stabilizing legs 46 and 48. Each of the stabilizing legs has a support foot 50 for stabilizing the device over the hole in the ice 14. As with the previously described version, the stabilizing legs swing into the device body 26 for storage. Also included with this device is a motor 84 and batteries 85. The motor has a shaft 81 to which are attached one or more cams 82. As the motor rotates, each of the cams comes into contact with the lower portion of the first frame 78 and causes the first frame 78 to rotate around bracket pin 88. First frame 78 is attached to second frame 80 at a linkage bracket 108. The first frame 78 is attached to the linkage bracket 108 through a bracket pin 88. A number of holes are provided 79 in the first frame so that the mounting can be moved back and forth to adjust the balance for different fishing rods. Although the jigging device is shown at the end of the first frame under the fishing rod handle, obviously a similar jigging device could be mounted at the opposite end and would have the same jigging effect on the fishing line.

FIG. 5 is another view of the trigger 52 showing the release bar 68 and the attachment accessory receptacle 60. In this view the rod tip 20 is held in engagement with the trigger by the attachment accessory 40. Notches in the accessory device receptacle 60 are visible (102). The amount of tension require to rotate the sensing tab 104 downward can be adjusted according to which notch 102 the accessory device is placed into.

Figure 6:
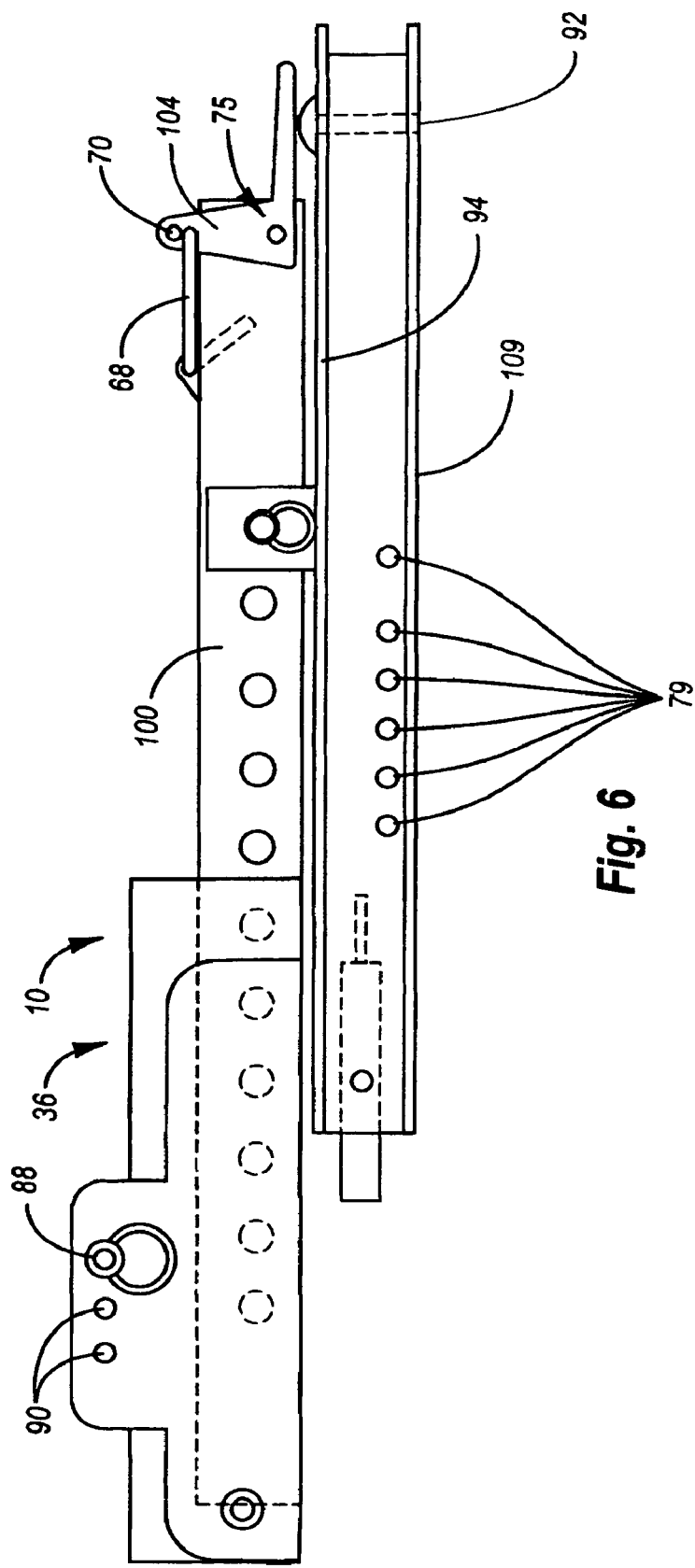
FIG. 6 is a side view of the device body of the ice fishing device of the invention in a folded up position.

FIG. 6 is a side view of the ice fishing device 10, showing the rod holding bracket 36, the release bar 68, the trip bar 70, the sensing tab 104, and the adjustment bar 100.

The exemplary embodiments shown in the figures and described above illustrate but do not limit the invention. It should be understood that there is no intention to limit the invention to the specific form disclosed; rather, the intention is to cover all modifications, alternative constructions, and equivalents falling within the spirit and scope of the invention as defined in the claims. Hence, the foregoing description should not be construed to limit the scope of the invention, which is defined in the following claims.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A fishing device for use with a fishing rod and line, said device comprising:

A first frame with a first end, a middle section, a top, a bottom and a second end, with a rod holding bracket adjacent said first end and with a trigger adjacent said second end;

a second frame with a first end and a second end and a stabilizing means to support the second frame on a surface on which it is placed;

a linkage bracket configured to pivotally attach the first and second frames together with the linkage bracket attached to the middle section of the first frame;

the linkage bracket being a generally rigid structure and having sufficient height to create distance between the first and second frames with the linkage bracket providing a fulcrum so that the first frame can pivot back and forth;

a motor with an associated cam member used in conjunction with the first and second frames with said motor rotating the cam member so that the cam member contacts the first end of the first frame and acts upon the first end of the first frame so that the second end of the first frame raises and lowers;

with the linkage bracket located between the cam member and the second end of the first frame.

2. The fishing device of claim 1 in which the linkage bracket has a first end and a second end, said linkage bracket connects the first and second frames together and is rigidly fixed at said first end and pivotally attached at said second end between the first and second frames.

3. The fishing device of claim 2 in which said second end of the linkage bracket incorporates the use of a linkage bracket connection pin, with said pin configured to provide a rotational axis between the first and second frames.

4. The fishing device of claim 1 in which the first and second fames can detach and reattach to each other.

5. The fishing device of claim 1 in which the linkage bracket creates a fulcrum so that when an end of the first frame moves either up or down the opposite end of the first frame moves in the opposite direction.

6. A fishing device for use with a fishing rod and line, said device comprising:
   a first frame with a first end and a second end, with a rod holding bracket adjacent said first end and with a trigger adjacent said second end;
   a second frame with a first end and a second end, and a stabilizing means to support the second frame on a surface on which the second frame is placed;
   a linkage bracket, which contacts the first frame generally in the middle of the frame, and is configured to pivotally attach the first and second frames together;
   a motor with an associated cam member used in conjunction with the first and second frames with said motor rotating the cam member;
   the cam member is positioned at an end of the first frame and configured and positioned to rotate, contact a surface of the fishing device, and consequently move the first frame in a direction;
   then as the cam member continues to rotate said cam member breaks contact with the surface of the fishing device which frees said fishing device from the influence of the cam and allows the first frame to fall back in the opposite direction to said first frame's original position.

7. The fishing device of claim 6 in which the cam member attaches to the motor at an attachment point and the cam rotates around this attachment point which is a rotational center for the cam, the cam contains at least one projection extending from the rotational center of the cam.

8. The fishing device of claim 6 in which the cam member can detach from the motor and be exchanged for another cam member.

* * * * *